United States Patent Office.

FERDINAND BRÜNJES, OF LEOPOLDHALLE, PRUSSIA, GERMANY.

PROCESS OF OBTAINING POTASSIUM CARBONATE.

SPECIFICATION forming part of Letters Patent No. 376,366, dated January 10, 1888.

Application filed August 10, 1885. Serial No. 173,934. (No specimens.)

*To all whom it may concern:*

Be it known that I, FERDINAND BRÜNJES, a subject of the Emperor of Germany, residing at the city of Leopoldhalle, in the Kingdom of Prussia, German Empire, have invented a new and useful Improved Process for Producing Carbonate of Potassa, of which the following is a specification.

My invention has reference to those kinds of processes which are employed for the production of carbonate of potassium; and it consists in obtaining carbonate of potassium from carbonate of ammonia magnesia and chloride of potassium.

In carrying out my invention I mix carbonate of ammonia-magnesia with an approximately equivalent quantity of chloride of potassium, and I dissolve this mixture in water. For furthering the process as a whole I may conduct into the said mixture or solution carbonic acid, or carbonic acid and ammonia, either under or without pressure; but this latter proceeding is not, however, absolutely necessary for carrying out the process of my invention. After some time crystals of carbonate of potassium and other carbonic compounds are formed, while sal-ammoniac is present in solution with any chloride of potassium that may have been used in excess. The crystals so obtained are decomposed, by digestion with a suitable but not too small a quantity of water, in such manner that carbonate of potassium passes into solution, and the other carbonic compounds—such as carbonate of magnesia, &c.—remain behind.

By this process, as compared with the other processes for the production of carbonate of potassium, the following advantages are obtained: First, a thorough conversion of chloride of potassium is effected; second, the apparatus for the conversion of chloride of potassium into carbonate of potassium is the simplest that can be used, as the conversion may be carried out at any temperature and at any pressure; third, any chloride of potassium used in excess may be easily and completely recovered by treating the final lye-water with magnesia for the purpose of driving off the ammonia, whereby the chloride of potassium is caused to be precipitated in the form of a double salt of chloride of potassium and chloride of magnesium, termed "carnallite;" fourth, the chlorine previously combined with the chloride of potassium may be very completely recovered from the finally-resulting lye-water, in the form of muriatic acid, by steaming and heating the said lye-water.

What I claim as my invention, and desire to secure by Letters Patent, is—

The process of making potassium carbonate, which consists in dissolving potassium-chloride and ammonia-magnesium carbonate in water, removing the precipitate which forms, and separating the potassium carbonate by treating said precipitate with water, in which the other carbonates are less soluble, all substantially as described.

In testimony whereof I sign this specification in the presence of two subscribing witnesses.

FERDINAND BRÜNJES.

Witnesses:
 TH. V. HERTLING,
 B. ROI.